No. 737,755. PATENTED SEPT. 1, 1903.
A. MARCEAU.
TRIPOD HEAD.
APPLICATION FILED AUG. 26, 1902.
NO MODEL. 2 SHEETS—SHEET 1.
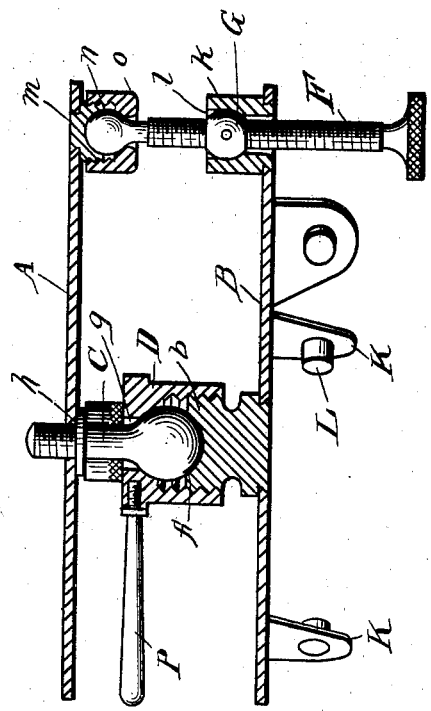
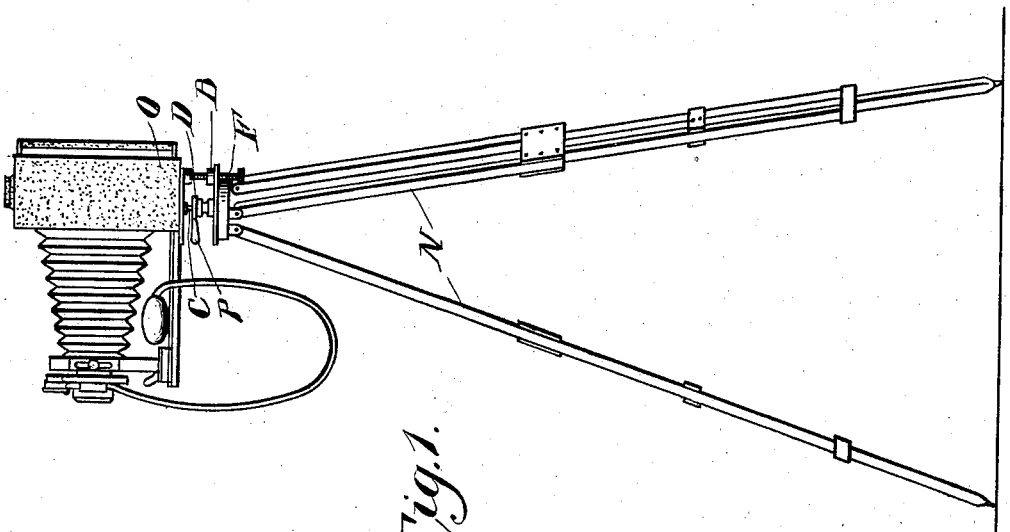
WITNESSES:
INVENTOR
Alfred Marceau
BY
Attorneys No. 737,755. PATENTED SEPT. 1, 1903.
A. MARCEAU.
TRIPOD HEAD.
APPLICATION FILED AUG. 26, 1902.
NO MODEL. 2 SHEETS—SHEET 2.
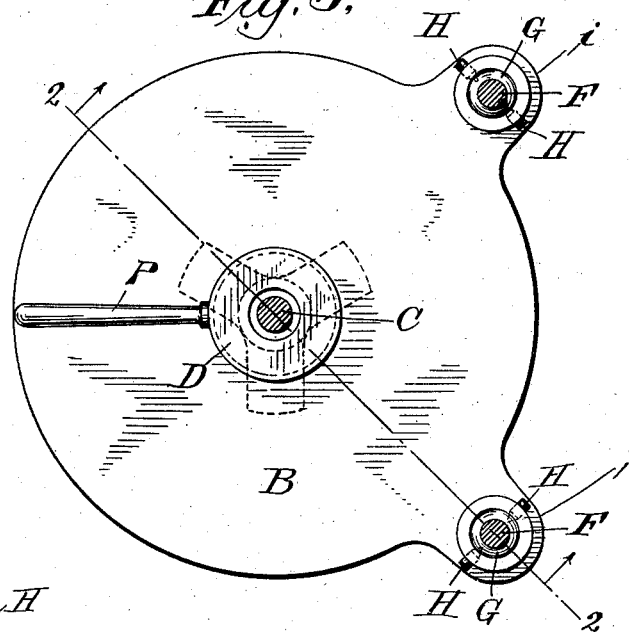
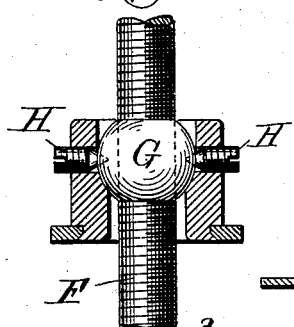
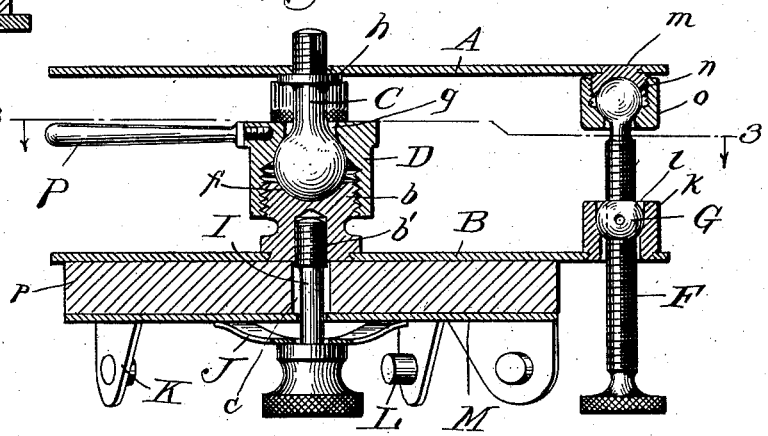
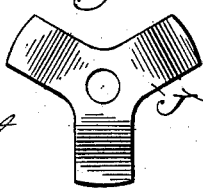
Witnesses:
Harry S. Marsh
Joseph F. Rust
Inventor:
Alfred Marceau
by Chandler & Chandler
attys No. 737,755. Patented September 1, 1903.

UNITED STATES PATENT OFFICE.

ALFRED MARCEAU, OF BROOKLYN, NEW YORK.

TRIPOD-HEAD.

SPECIFICATION forming part of Letters Patent No. 737,755, dated September 1, 1903.

Application filed August 26, 1902. Serial No. 121,120. (No model.)

*To all whom it may concern:*

Be it known that I, ALFRED MARCEAU, a citizen of the United States, residing at Brooklyn, in the county of Kings, State of New York, have invented certain new and useful Improvements in Tripod-Heads; and I do hereby declare the following to be a full, clear, and exact description of the invention, such as will enable others skilled in the art to which it appertains to make and use the same.

This invention relates to tripods for cameras, and more particularly to the heads thereof, and has for its object to provide a construction which may be embodied in an attachment for the head of an ordinary tripod and with which the camera may be adjusted to a level position after the legs of the tripod have been set and without requiring the legs to be moved in any manner.

Other objects and advantages of the invention have reference to the details of the structure of the invention and will be understood from the following description.

In the drawings forming a portion of this specification, and in which like letters of reference indicate similar parts in the several views, Figure 1 is an elevation showing a tripod embodying the present invention and having a camera mounted thereon. Fig. 2 is a view, partly in vertical section and partly in elevation, showing the invention as applied to the head of an ordinary tripod. Fig. 3 is a section on line 3 3 of Fig. 2. Fig. 4 is an enlarged sectional elevation and showing the pivotal mounting of one of the nuts of the adjusting-screws. Fig. 5 is an elevation showing the tension-plate. Fig. 6 is a view similar to Fig. 2 and showing a modification wherein the invention is not in the form of an attachment to an ordinary tripod.

Referring now to the drawings, and more particularly to Fig. 2 thereof, the invention is shown embodied in an attachment for a tripod, and consists of a plate B, centrally of which is secured the threaded stud *b* by passing it through and riveting it in a perforation in the plate, and in the lower end of the stud is formed a threaded longitudinal perforation *b'*, which is adapted to register with the central perforation *c* in the head *d* of the common tripod.

In the upper end of the stud *b* is a socket *f*, and the upper end of the stud is exteriorly threaded, as shown. Upon the threaded upper end of the stud *b* is screwed a cap D, having a central opening *g* through its upper end and the wall of which adjacent to the inner end of said opening is concaved with the same curvature as the socket of the stud *b*.

A top plate or supporting-plate A is provided, upon which the camera is directly supported, and through a central perforation in this plate is passed the threaded upper end of a clamping-screw C, having a flange *h*, which impinges against the under face or bottom of the plate. The lower end of the clamping-screw C is spherical, as shown, and rests in the socket of the stud *b* and in contact with the concaved wall of the nut or cap D, so that by screwing the cap down upon the stud the screw C may be clamped in alinement with or at any desired angle to the axis of the stud to correspond to the different adjusted positions given to the plate A, as hereinafter described.

From the periphery of the plate B project the arms or ears *i*, which are preferably separated by an angular distance of approximately ninety degrees, and these ears carry sleeves *k*, which project upwardly and parallel therefrom and through which are formed passages *l*, these sleeves being engaged in and riveted in perforations in the ears, as shown. In each of the passages *l* is disposed a spherical nut G, with which are engaged at diametrically opposite points pivot-screws H, passed through the sides of the sleeves, so that the nuts may be rocked each in a plane including the axis of the plate A. Depending from the plate A are the threaded studs *m*, which are riveted into the plate, and in the lower ends of which studs are sockets, as shown at *n*, which receive the spherical upper ends of adjusting-screws F, which are engaged with the nuts G. Caps *o* are engaged with the studs *m*, so that there are formed adjustable and clamping sockets for the balls or spheres of the screws.

With this construction it will be seen that the screws F may be adjusted through their respective nuts to incline the supporting-plate A in any direction, after which the cap D may be screwed down upon the stud to clamp the screw C and hold the plate against further movement, it being understood that at this time the camera is in place upon the plate A, so that the plate is firmly connected to the screw C.

The plate B is disposed upon the ordinary tripod-head, having the plate M attached to its under face and provided with depending ears K, provided with studs L for engagement in the perforated ends of the members N of ordinary tripod-legs. Through the head is engaged the ordinary clamping-screw I, which is usually engaged in the threaded opening in the bottom of the camera-box; but in the present instance this screw is engaged in the threaded opening $b'$ in the lower end of the stud $b$ to hold the attachment to the tripod-head. The screw I is passed through the tension-plate J, having bent fingers which bear against the under face of the plate M and are placed under tension when the screw I is engaged with the stud D, so that the plate B is held upon the head with sufficient firmness to prevent accidental turning of the plate B, while permitting it to be adjusted when desired.

In the use of the invention the tripod is set up in the usual manner, so as to secure a firm footing, and the camera-box O having been placed upon the plate A, as shown in Fig. 1, the cap D is loosened and the screws F adjusted to bring the plate A to a horizontal position or in whatever other position may be required to hold the camera as required. The cap D is then screwed down by means of the handle P to clamp the screw C and hold the plate against displacement.

In Fig. 6 of the drawings there is shown a construction wherein the plate B has the ears K formed thereon for attachment of the tripod-legs, thus discarding the screw I, plate M, and the wooden head.

In practice other modifications of the invention may be made and any suitable materials and proportions may be used for the various parts without departing from the spirit of the invention.

What is claimed is—

1. A device of the class described comprising a plate having a threaded stud thereon having a socket in its extremity, a second plate having a stem rotatably engaged therethrough and having a ball at its lower end resting in the socket, a screw-cap engaged with the stud over the ball and having an operating-handle, the stem above the second plate being threaded for engagement with a camera-box, sockets carried by the second plate, pivoted nuts carried by the first plate and adjusting-screws engaged through the nuts and having balls at their upper ends engaged with the sockets of the supporting-plate.

2. An attachment for tripods comprising a base-plate having means for engagement by the clamping-screw of the tripod, a supporting-plate having a stem rotatably mounted therein, said stem being mounted upon the base-plate for universal movement and having its upper end threaded and projecting above the supporting-plate, an adjusting-screw connected between the plates for tilting the supporting-plate.

3. A device of the class described comprising a base-plate, a supporting-plate having a stem rotatably mounted therein and projecting above and below the plate, the upper end of the stem being adapted for engagement with the camera and the lower end of the stem being connected with the base-plate for universal movement, and means connected between the plates for moving them into and out of parallel relation.

In testimony whereof I affix my signature in presence of two witnesses.

ALFRED MARCEAU.

Witnesses:
   JACOB HALVERSEN,
   WILLIAM P. CARROLL.